Nov. 29, 1966 J. R. DAVIS ETAL 3,289,210

MAGNETIC DIGITAL RECORDER

Filed Jan. 4, 1962 4 Sheets-Sheet 1

John R. Davis
Edwin D. Nuttall
Albert M. Randolph
William C. Tomerlin Jr.
INVENTORS BY J. Vincent Martin
Joe E. Edwards
M H Gay
ATTORNEYS

MAGNETIC DIGITAL RECORDER

Filed Jan. 4, 1962 4 Sheets-Sheet 2

John R. Davis
Edwin D. Nuttall
Albert M. Randolph
William C. Tomerlin Jr.
INVENTORS

BY
ATTORNEYS

John R. Davis
Edwin D. Nuttall
Albert M. Randolph
William C. Tomerlin Jr.
INVENTORS
J Vincent Martin
BY Joe E. Edwards
M H Gay
ATTORNEYS

MAGNETIC DIGITAL RECORDER

INVENTORS
John R. Davis
Edwin D. Nuttall
Albert M. Randolph
William C. Tomerlin, Jr.
BY
Adolph C. Hugin
ATTORNEY 3,289,210

MAGNETIC DIGITAL RECORDER

John R. Davis, Edwin D. Nuttall, Albert M. Randolph, and William C. Tomerlin, Jr., all of Shreveport, La., assignors to United Gas Corporation, a corporation of Delaware Filed Jan. 4, 1962, Ser. No. 165,717
23 Claims. (Cl. 346—74)

This invention relates to recording devices and more particularly to magnetic digital recorders.

This application is a continuation-in-part of our application Serial No. 857,452, filed December 4, 1959, now abandoned.

The increasing complexity of modern business and industry, particularly in the volume of units, readings, etc. that must be handled, has developed a need for a portable or semi-portable device relatively small in size and simple to operate which is capable of recording information for input into computers. The device may be used for any purpose in which listing of numbers, preparation of tallies, lists or the like is required. For example, the device might be used in stores for taking inventory, in railroads for freight car checking, and the like.

One large field in which a device of this sort will be useful will be in the reading of utility meters. The device selected for illustrating this invention was particularly developed for use by a public utility in recording periodic domestic meter readings on magnetic tape at the site of the meter. The tape thus prepared when fed into a computing system through appropriate circuitry for recorder-to-computer code conversion becomes input information to a digital computer for computing and billing purposes.

It is an object of this invention to reduce the manpower presently required and reduce errors inherent in converting data readings into bills, records, etc., as for instance converting utility meter readings into bills for forwarding to the consumer.

Another object is to provide an apparatus for acquiring data by initially recording the data in the apparatus in a form or code which may be converted through appropriate circuitry into bills, records, etc., by computers, in which the apparatus is small and easy to operate.

A further object is to provide an apparatus for magnetically recording data in digital form and appropriate code in which the recorded tape from the apparatus can be fed directly into interpreter or converter units where conversion from recorder code to computer code is accomplished and simultaneously fed into a computer programmed for processing the data.

Yet another object is to provide an apparatus for magnetically recording data in which the magnetic tape is kept in accurate alignment and contact with the recording head to prevent double and erratic recordings.

A yet further object of this invention is to provide an apparatus for magnetically recording data in which the tape is moved only when actual recording is done, thereby using a minimum amount of tape.

A still further object of the present invention is to provide a device for magnetically recording data on tape while the tape is stationary and intermittently step advancing the tape after each recording whereby the information pack on the tape is increased.

Another object of this invention is to provide a magnetic data recorder in which the tape is kept taut and accurately positioned on the recording head at all times during normal handling as a portable unit.

Still another object is to provide a magnetic data recorder in which the recorder is constructed to prevent recording of more than one value for each reading.

A still further object is to provide an apparatus for the magnetic recording of data in which the data fed into the machine may be visually checked for accuracy before it is recorded on the magnetic tape.

Another object is to make a recorder with azimuth adjustment so that a multiplicity of such units will make tapes which are identical so that all tapes may be fed into a common interpreter unit for resulting input to a computer system.

A further object of this invention is to provide an apparatus for magnetically recording data in which the recording is done at slow and intermittent speeds in a manner suitable for transmission to a computer via an interpreter unit at high speeds.

Another object of this invention is to provide basic apparatus for magnetically recording data in which various codes may be provided by use of suitable switches, recording heads, and wiring.

Yet another object of this invention is to provide an apparatus for magnetically recording data in which computer instructions may be recorded on the tape along with the data.

Still another object of the present invention is the provision of an improved drag brake especially useful in a tape reel assembly.

Other objects, features and advantages of the invention will be apparent from the specification, the drawings and the claims.

In the drawings, wherein there is shown by way of illustration one form of this invention, and wherein like reference numerals indicate like parts:

Figure 6:
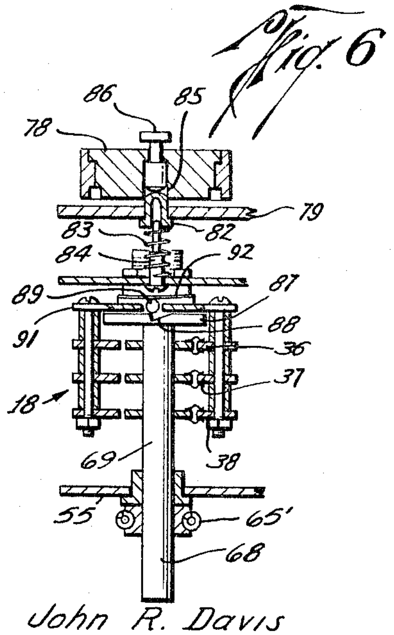
FIGURE 6 is a view along the lines 6—6 of FIGURE 5 through the read-out commutator assembly.
Figures 9, 10, 11, 12, 13:
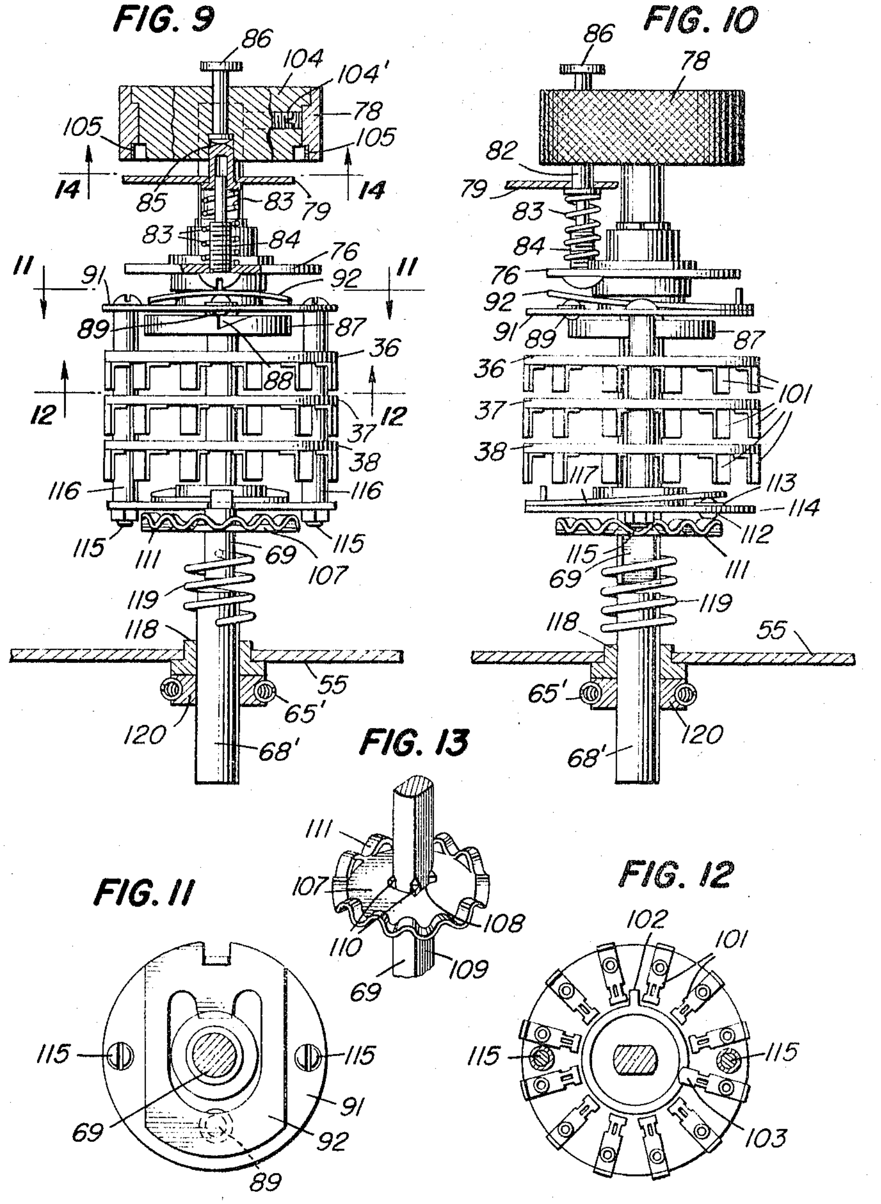
Figure 14:
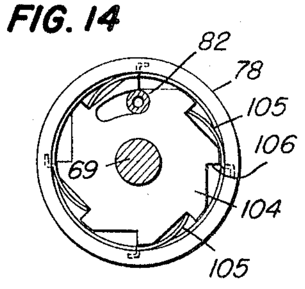

FIGURE 9 is an elevational view, partly in section, illustrating a variation of the commutator and the driving mechanism for the apparatus shown in detail in FIGURE 6 and shows an intermittent delayed-drive connection for the tape driving capstan, especially adapted for use in a system in which the recording is done while the tape is stationary and it is then step advanced after each digital recording;

FIGURE 10 is an elevational view of the commutator and the driving mechanism viewed at 90° to the position shown in FIGURE 9;

FIGURE 11 is a sectional view taken along line 11—11 of FIGURE 9, showing the spring biasing construction of the single-turn one-way drive latch;

FIGURE 12 is a sectional view taken along line 12—12 of FIGURE 9, showing the arrangement of the contacts and contactor of each wafer of the commutator;

FIGURE 13 is a perspective view of the advance step latching disc mounted on the drive shaft of the commutator; and FIGURE 14 is a sectional view taken along line 14—14 of FIGURE 9, showing a detail of the one-way drive for the commutator through its operating knob.

Figure 8:
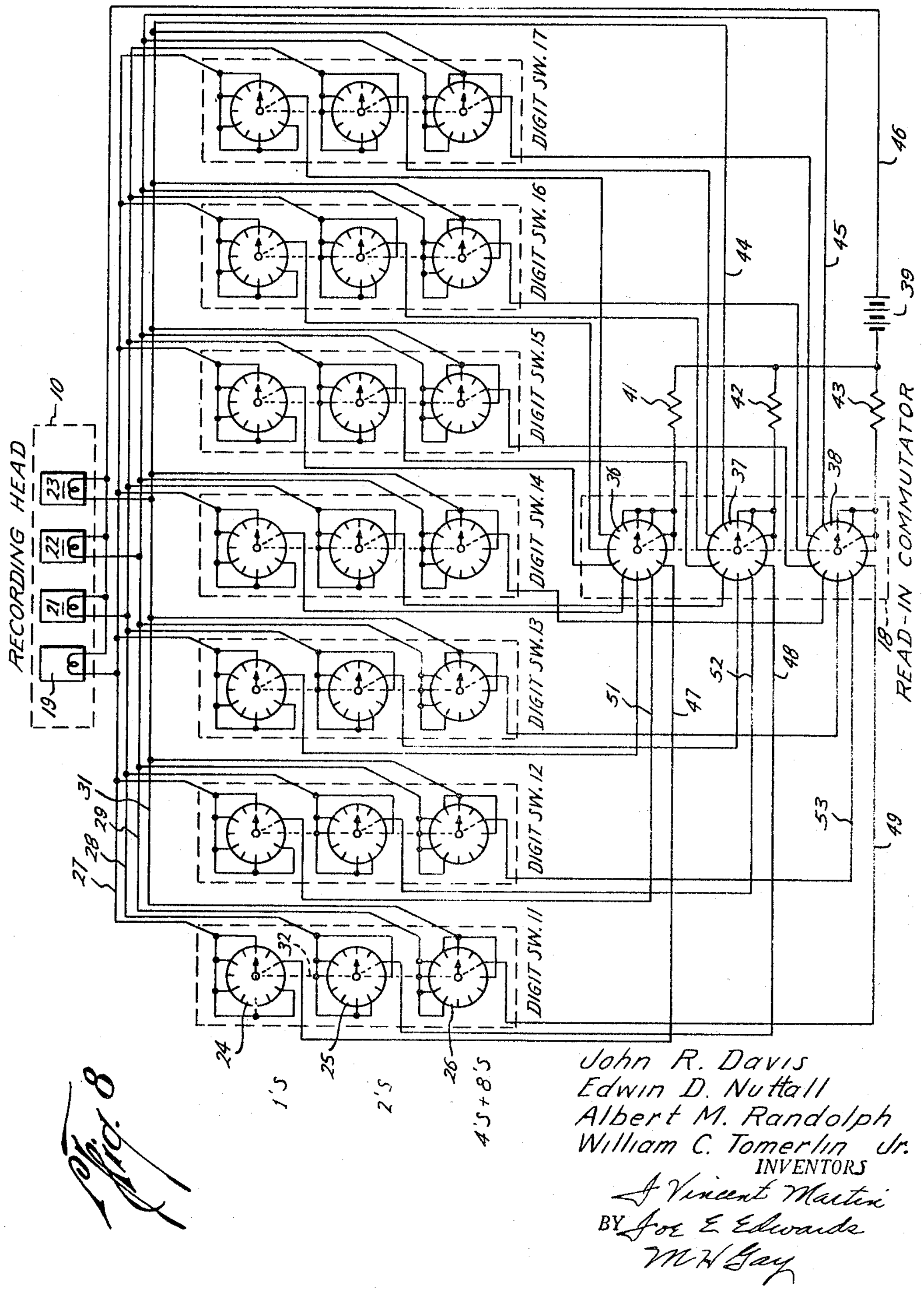
FIGURE 8 is a wiring diagram of the device shown in FIGURES 1 to 7.

Reference is first made to FIGURE 8 wherein the wiring diagram illustrates the underlying principles of the invention. The circuit illustrated in FIGURE 8 includes a recording head 10, a plurality of variably settable digit switches 11 through 17, and a read-in sampling or interrogating switch or commutator 18. In broad principle, numbers are dialed, according to the required code or data, into each of the digit switches and then the read-in commutator is operated simultaneously to move the tape in a forward direction and to interrogate these digit switches successively to energize selected tracks of the recording head. As the tape is moved, the digit switches are being interrogated and the recording head is simultaneously recording successive numbers on the tape.

The recording head may be of any desired manufacture as long as it fits some general specifications for either D.C. or A.C. recording energy. It is preferably of the type in which the desired number of recording channels are provided in a single head with the recording channels transverse of the direction of the movement of the tape. In the illustrated embodiment, a binary coded decimal code is utilized and track 19 provides the decimal digit one, track 21 provides the decimal digit 2, track 22 provides the decimal digit 4, and track 23 provides the decimal digit 8. In this particular embodiment, zero is recorded by simultaneously recording a 2 and an 8, and computer instructions for defining the end of a word is recorded by simultaneously recording a 4 and an 8. The subsequent electronics at the computing system location convert this data into computer instructions and data. It is evident then, that by energizing selective groups of tracks the numerals 0 through 9, as well as computer instructions, may be readily recorded.

With most recording units, it is desirable to record both an identification number as well as a reading or count. In the illustrated embodiment, which was particularly designed for reading utility meters, digit switches 11, 12, and 13 are designed to record the meter identification number. Digit switches 14 through 17, inclusive, record the thousands, hundreds, tens and units of the meter reading.

The dial input digit switches may take any desired form. In the described example the digit switches illustrated are identical and are wired identically for binary coded decimal coding as described in a preceding paragraph. Therefore, only digit switch 11 will be explained in detail. This switch is of the triple wafer type with 30 degree contact spacing providing for variably setting it to twelve incremental positions. Switch wafer 24 provides the selective energizing of track 19 of the recording head, wafer 25 provides for selective energizing of track 21, and wafer 26 provides for the selective energizing of both tracks 22 and 23. It will be noted that with the code used here each wafer is provided with 12 contact points or circuit connectors wired into the circuit as required. Wafer 24 is connected to track 19 through a suitable conduit 27. The conduit 27 is electrically connected to the wafer 24 at the numerical or switch indicia positions 1, 3, 5, 7, and 9. The wafer 25 is connected to track 21 through line 28. The wafer 25 is connected to line 28 at the numerical or switch indicia positions 2, 3, 6, 7, and 0. The wafer 26 is connected to track 22 through line 29 and and to track 23 through line 31. The wafer 26 is connected to line 29 at numerical or switch indicia positions 4, 5, 6, and 7. The wafer 26 is connected to track 23 through line 31 at numerical or switch indicia positions 8, 9, and 0.

Figure 7:
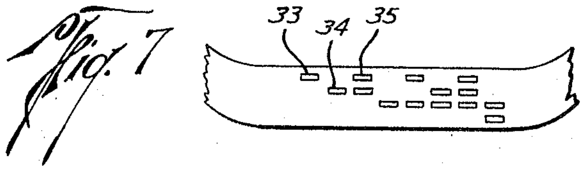
FIGURE 7 is a view of a fragment of a tape made by the apparatus illustrating with blocks the magnetized sections of the tape.

The three wafers 24, 25, and 26 and their rotating arms are ganged together as indicated by the dashed line 32. It is obvious that the rotating arm can be set to any position corresponding to numerals or switch indicia 0 through 9 and that these numerals will be recorded on the tape when the digit switch position is interrogated by the commutator or read-in switch which energizes the circuit. For instance, with the digit switch set in the "1" position it will be noted that only wafer 24 is connected to the recording head. Thus, upon energizing the digit switch through the commutator 18, there will be a momentary circuit completion to track 19 of the recording head thus recording the single blip 33 as shown in FIGURE 7. When the digit switch is set for the numeral 2, only wafer 25 is connected to the recording head and thus the track 21 can be momentarily energized to record the blip 34. When the switch is set for the numeral 3, wafers 24 and 25 are connected to tracks 19 and 21 in the manner described above to record the two side-by-side blips 35. By following the wiring diagram of FIGURE 8, it will be seen that with the digit switches positioned at successive numbers 0 through 9, binary coded decimal blips will be recorded on the four tracks of FIGURE 7 when the switches the interrogated momentarily by the read-in commutator 18. The numerals 1 through 7 are shown recorded in this form reading from left to right in succession on FIGURE 7. The eighth unit indicated on FIGURE 7 is the blips made by tracks 22 and 23, and is an end-of-word signal which is recorded by the read-in commutator.

The read-in commutator successively momentarily energizes the recording heads through digit switches 11 through 17 after they have all been set to the desired numbers. The read-in commutator also is a three-wafer design and includes wafers 36, 37, and 38. The read-in commutator 18 is connected to a source of power provided by battery 39 through appropriate balance and limiting resistors 41, 42, and 43. Reading clockwise from the off position, the read-in commutator 18 is successively momentarily connected to the digit switches 11 through 17, inclusive, in the numerical positions 1 through 7 successively. As only 7 digit switches are used in this example, this leaves the 8, 9, 10, and 11 positions of the read-in commutator for other purposes. The 12th position is the off position. In this illustration the eighth contact on commutator wafer 38 is connected through line 45 to recording track 22. In like manner, the eighth contact of commutator wafer 37 is connected through line 44 to recording track 23. Thus, as the commutator is rotated through the eighth position the tracks 22 and 23 are momentarily energized recording the end-of-word signal on the tape in the 4's and 8's digit positions as shown in FIGURE 7. It is noted that all circuits are completed through the return line 46 to battery 39.

It is, of course, apparent that a recording head might be provided for each digit switch, but as these units are expensive it is desired to use a single recording head. A single head is more desirable also from the viewpoint of treating the recorded information for visual presentation and checking purposes. In use, the tape is moved relative to the recording head concurrently with the commutator rotation which interrogates each digit switch. In this manner the data is successively recorded on the tape as indicated in FIGURE 7.

In operation, the digit switches being set, the read-in commutator is first turned to the number 1 position at which point the lines 47, 48, and 49 are energized. It will be noted that the lines 47, 48, and 49 are connected respectively with wafers 24, 25, and 26 of the digit switch 11. Thus, the wafers of digit switch 11 which are positioned for electrical communication with the recording head are energized. In like manner, the numerical position 2 of the read-in commutator 18 is connected to the wafers 24, 25, and 26 of digit switch 12 through lines 51, 52, and 53, respectively. Thus, as the read-in commutator is rotated to the number two position the digit switch 12 is interrogated. As mentioned previously and as described below, the tape moves concurrently with interrogation action.

After all of the digit switches have been interrogated, the commutator or interrogating switch energizes lines 44 and 45 to give the end-of-word signal by energizing tracks 22 and 23. After the read-in commutator returns to the off position, the several digit switches may be changed preparatory to recording the reading of a different meter.

In the FIGURE 8 diagram the electron current flow is from negative battery through the current limiting resistors and then through the wafer or wafer segment of the commutator switch and then through the appropriate connection on the digit switch then through the winding of the appropriate track in the record head and then to positive battery. A careful inspection of this drawing will show that there are four principal busses between the digit switches and the record heads and that these busses correspond to decimal digits 1, 2, 4, and 8, and that all digit switches multiple to these busses are connected in such a manner as to permit recording in binary decimal code the digits from 0 to 9. A careful inspection will further show that each digit path from negative battery through to the output side of the head winding is kept definitely separate from every other path. If this were not done, occasional parallel paths could occur for some settings of the digit switches and a crossfeed between digits could occur which would result in erroneous recording of some digits. It may be noted that the circuits are broken up to avoid all conditions of cross-feed by using a separate wafer or wafer segment on the read-in commutator for each decimal digit 1, 2, 4, 8. Of course, other combinations of switches, wafers and connections to achieve the same result would be possible with this or other codes. Other codes would require that the same conditions be met although they would be handled in a different manner electrically.

Reference is now made to FIGURES 1 through 6 in which the described form of apparatus for carrying out this invention is illustrated. The recording head 10 is shown to be of the type of which has four recording tracks 19, 21, 22, and 23, arranged side-by-side. The recording head should be exactly aligned with the tape passing thereover, and for this purpose the recording head 10 is mounted on a U-shaped bracket 54 having a novel mounting with the support plate 55. One foot 56 is secured to the plate 55. The other foot 57 of the mounting member is spaced from the plate 55 and a compression spring 58 is inserted between the foot 57 and the plate 55. With this arrangement the foot 57 is urged away from plate 55 by spring 58 and is moved toward the plate 55 by the bolt 59. Thus, by adjustment of the bolt 59 the gaps of the tracks of the recording head 10 may be adjusted to a position exactly perpendicular to the direction of movement of magnetic tape thereacross.

A real assembly forming part of a magnetic tape transport assembly is indicated generally at 61. This assembly provides for passing a magnetic tape 62 over the recording head 10. The degaussed magnetic tape from the payout reel 63 passes over guide 64 over the recording head 10. A pressure pad 65 mounted on leaf spring 66 carried by split bolt 66a tends to hold the tape firmly in contact with the recording head. From the recording head the tape passes over guide 67 around the end capstan portion 68 of the capstan shaft 69 which forms a drive roller. A pressure roller 70 is rockably mounted on a spring loaded arm 71 pivotally supported by a pin 71' secured to the frame base 55, as is more clearly shown in FIGURE 5. The spring loading of the roller is provided by a coil spring 70' held in torsion by engagement of its ends with the frame base plate 55 and the arm 71. In this manner, the roller 70 is resiliently biased into engagement with tape on the capstan and holds the tape firmly in engagement with the capstan to prevent slippage and to provide frictional driving engagement therewith. From the capstan the tape is fed onto the take-up reel 64' which is driven from the capstan by a spring belt 65'. The spring belt will tend to maintain the tape under tension from the capstan to the take-up reel.

Figures 1, 2, 3:
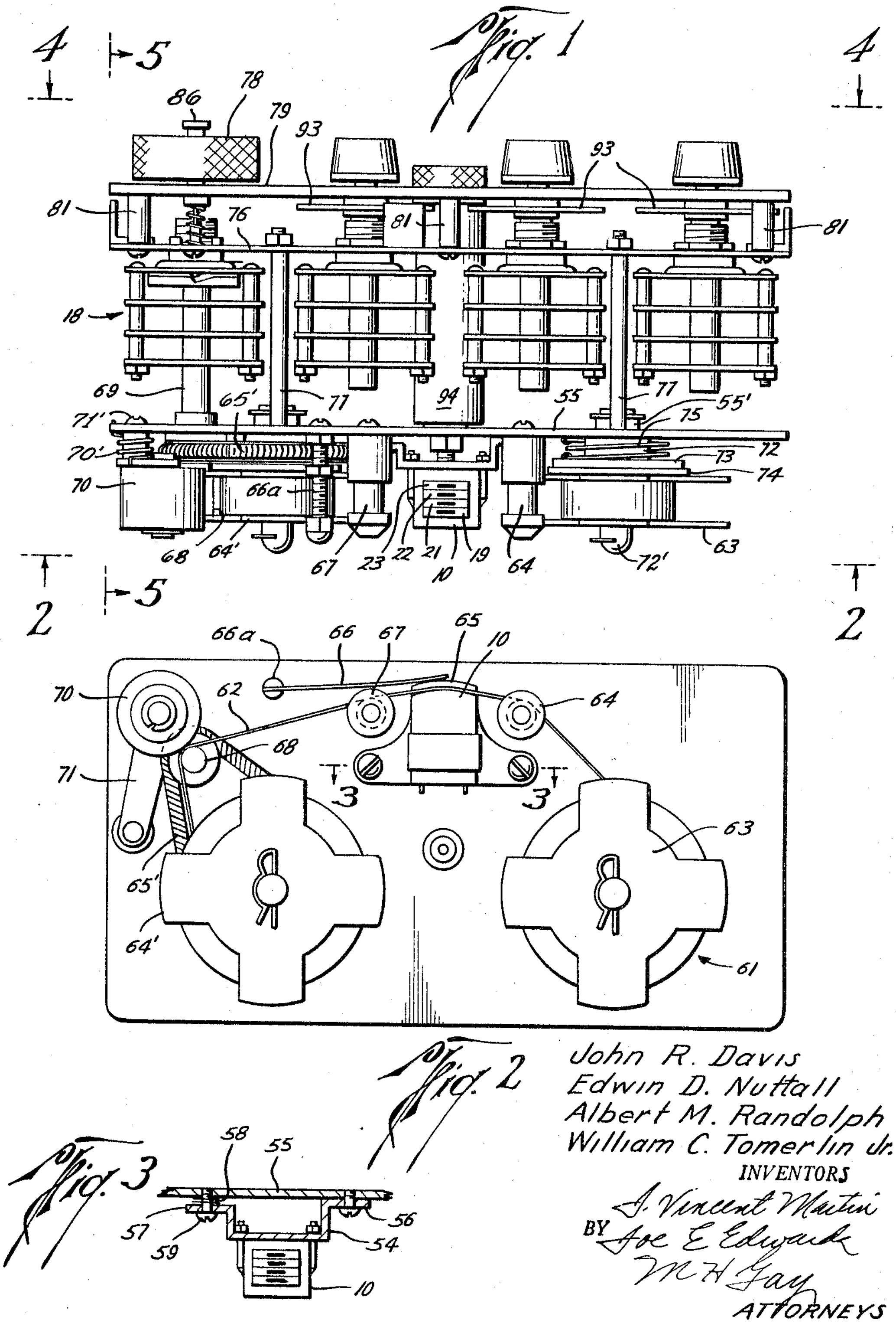
FIGURE 1 is a view in side elevation of the apparatus of this invention with the enclosure case and the pressure pad omitted.
FIGURE 2 is a view along the lines 2—2 of FIGURE 1 showing the bottom or back side of the apparatus.
FIGURE 3 is a view along the lines 3—3 of FIGURE 2 illustrating a fragment of the apparatus.

A back tension means in the form of a drag brake is provided for holding the tape taut between the capstan and the pay-out reel. This means is best shown in FIGURE 1. The pay-out reel 63 is rotatably mounted on a suitable reel support. This reel support may include a structure formed by a sleeve 72 with a friction plate 74 and a mounting post 72', all secured together and to the reel in any suitable manner and rotatably mounted on the frame plate 55 by a supporting bearing 55'. A second friction plate 73 is rotatably mounted on the sleeve 72 and is adapted to be resiliently biased into frictional engagement with the friction plate 74 fixed to the pay-out reel 63. This frictional engagement of the two friction plates 73 and 74 is conveniently provided by a coil spring 75 pinned or otherwise suitably anchored at one end to the frame support plate 55 and at the other end to the rotatable friction plate 73. The frictional drag between the friction plates is provided by placing this spring under compression when it is assembled. As the pay-out reel is rotated by the capstan pulling the tape off of the pay-out reel, the frictional engagement between the plates 73 and 74 causes the spring 75 to unwind and place a back tension on the pay-out reel. This back tension resists rotation of pay-out reel 63, and a substantially constant back pressure is applied to the pay-out reel 63. Of course, the plates 73 and 74 provide for slippage to permit rotation of the pay-out reel. The above described actions working in opposition from the capstan keep the tape taut and in correct position even under the conditions of rough handling and provide for advancing the magnetic recording tape as an inelastic member over the face of the recording head past the gaps therein in a manner that permits recording at any speed of advance of the tape.

A second base plate 76 is secured to the base plate 55 in spaced relationship therewith by spacer bolts 77. Preferably, four rectangularly spaced spacer bolts 77 are utilized, as may be seen from a comparison of FIGURE 1 and FIGURE 5.

The read-in commutator 18 is secured to the base plate 76 and the capstan shaft 69 of the read-in commutator extends through the base plate 55. Thus, by rotation of the read-in commutator the magnetic tape is moved across the reading head 10 by the capstan 68 attached to the commutator. The commutator 18 is rotated by a unidirectional knurled knob 78 which is positioned above the closure plate 79. Unidirectional rotation is provided by a ratchet in the knob (not shown). This closure plate 79 forms a portion of the container box for the unit, the remainder of which is not shown. The closure plate 79 is spaced from the base plate 76 by a plurality of spacers 81.

The commutator 18 must be rotated a full turn for each reading, and should begin from a fixed "off" position. In order to provide a point of beginning and a stop for the read-in commutator, a latch means is provided as best shown in FIGURE 6. A detent 82 is carried in the closure plate 79 below the knurled knob 78. This detent is urged toward the knob by compression spring 83 mounted on the detent guide screw 84. The detent projects into a bore 85 within the knurled knob 78 to latch the knob against rotation. After the data has been placed in the apparatus by setting of the digit switches, a detent release plunger 86 in the knurled knob 78 may be depressed to move the detent 82 out of bore 85 and release the latch means to permit rotation of capstan 68.

In order to prevent re-engagement of the latch means before the operator can operate the knurled knob, a means is provided for automatically turning the commutator 18 and capstan 68 a sufficient distance to prevent re-engagement of the latch means. For this purpose, capstan shaft 69 is provided with a disc 87 having a notch 88 therein. A ball 89 is positioned in a hole in the top disc 91 of the read-in commutator. This hole overlies the notch 88 and disc 87. A leaf spring 92 urges the ball into engagement with the disc 87. The construction of parts is such that when the detent 82 is engaged the ball 89 partially overlies the notch 87 with the center of the ball just past the leading edge of the notch. Thus, when the detent 82 is released the spring 92 acting downwardly on the ball will force it down into notch 88 resulting in a slight rotation of the commutator 18 and capstan 68 to a position at which the detent 82 is no longer in register with the bore 85. At this time the knob 78 may be rotated to rotate the commutator 18 and capstan 68 through 360 degrees at which point the detent 82 will again move into bore 85 to lock the read-in commutator against further movement. This commutator construction provides an arrangement for manually operating the tape transport assembly through the capstan 68 and for synchronously energizing the recording head channels which have been selected by the setting of the several digit switches 11 through 17. The selected channels are serially energized as the respective digit switches are commutated. The tape transport assembly provides for keeping the tape taut at all times between the pay-out reel and the take-up reel, even though the tensions in different parts of the tape may not be uniform. The tape driving mechanism provides for advancing the tape a substantially uniform predetermined step or length of tape during the recording of each digit, while the synchronizing with the advance of the tape of the energization of the selected recording head channels through the digit switches provides for an energization of the respective selected channels during a substantially uniform fraction of the step of advance of the tape for each digit recorded.

Figure 4:
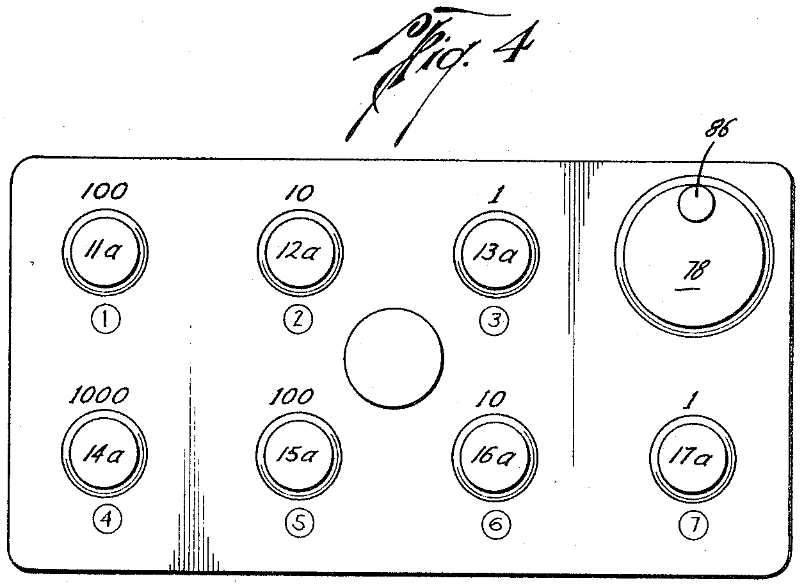
FIGURE 4 is a view in elevation of the front or top of the apparatus and is taken along the lines 4—4 of FIGURE 1 and reversed.
Figure 5:
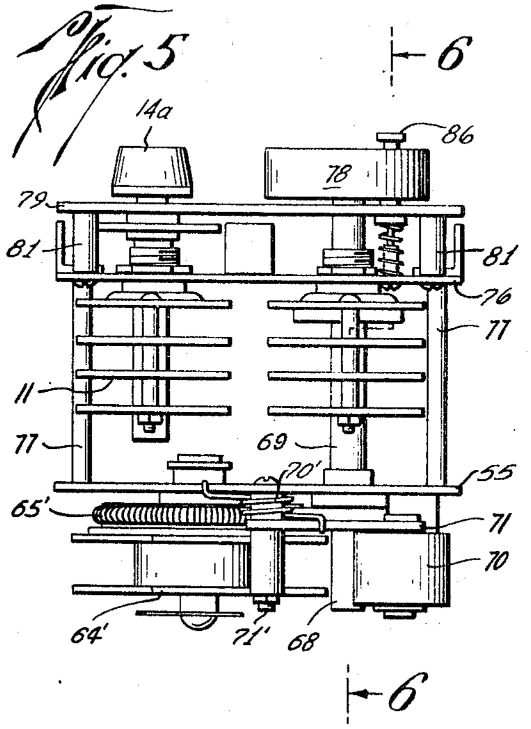
FIGURE 5 is an end view in elevation of the apparatus taken along the lines 5—5 of FIGURE 1.

The several digit switches 11 through 17, inclusive, are mounted on the base plate 76 and extend through the cover plate 79 to knobs 11*a* through 17*a*, inclusive, which provide for manual manipulation of the digit switches. Adjacent each knob an inspection window is provided in cover plate 79. Each of the dial input digit switches is provided with an indicia plate 93 which is non-rotatably mounted on the rotor of the digit switch and positioned immediately adjacent to the cover plate 79. These discs have numerical indicia 0 through 9 thereon. As each of the digit switches is rotated, the indicia provide visual indicating means which will appear in the windows adjacent to the digit switches, as shown in FIGURE 4. Of course, the numerical indicia are correlated with the contacts of the digit switch so that when the numeral 1 appears the digit-switch rotor is in the number 1 position.

The power source 39 will usually be provided by a battery in the battery case 94.

In the use of the apparatus the recording head is carefully aligned with the tape track. A degaussed magnetic tape is provided on the pay-out reel and the free end of the tape threaded over the recording head, through the capstan pressure roller assembly, and attached to the take-up reel.

This embodiment of the apparatus is then given to a meter reader who makes his rounds from house to house in the usual manner. In making a recording of a consumer's utility meter, the meter number is dialed into the machine by rotating the knobs 11*a*, 12*a*, and 13*a*. The meter reader then manipulates knobs 14*a*, 15*a*, 16*a*, and 17*a* to reflect under the windows associated with these knobs the thousands, hundreds, tens and units, respectively, of the reading of the meter. In making these adjustments the operator of the unit will position the several rotors of each digit switch in a position to record in binary coded decimal form the meter number and numerical value of the reading in the manner before explained. After setting all of the knobs, the meter reader should again carefully check the reading to make certain that the meter numbers and the meter reading are correct. Upon satisfying himself of the correctness of the reading, the operator will depress the detent release button 86, and then rotate the large knob 78 which controls the read-in commutator. As this knob is rotated through 360 degrees, it moves the tape across the recording head simultaneously recording the meter number and reading, as it interrogates successive ones of the digit switches by completing the electrical circuit between the battery 39, the read-in commutator, the several contacts of the digit switches and the recording head. As the commutator reaches its 8th position, the end-of-word signal is generated by completing a circuit between the commutator and the recording head to signify the end of the reading. As the read-in commutator returns to off position, the detent 82 arrests further movement of the read-in commutator until the next reading has been placed on the apparatus and the detent release depressed.

The meter reader will continue taking readings in this manner until he has completed his rounds.

After the tape has been loaded with readings, it is removed from the machine and may be processed in any desired computing device equipped with an interpreter or converter unit and programmed for the particular values to be introduced and the jobs to be processed.

For instance, the tape may be fed through an interpreter unit in which some computer instructions are generated, and the computer instructions together with signals representative of those on the tape recorded by this apparatus fed into a computer such as the Datatron 204. The necessary instructions for the Datatron, or for other computers, can be provided by interpreter units which are designed for particular applications. The particular instructions will vary from computer to computer, and the design of the interpreter unit will vary depending upon the differences in instructions, the type of computer and the programming of the data introduced.

While the unit was explained in detail as being applicable to meter reading device operated by direct current, it will be understood that the unit could be operated on alternating current, although the circuitry would be somewhat more complex.

The apparatus illustrated in FIGURES 1 through 6 is a meter reader's apparatus, and the drawings represent approximately the size of the unit, that is, approximately 6 inches by 3½ inches by 3½ inches. It will be appreciated that such a unit can be conveniently worn about the body of a person making a meter reading.

It will be apparent to those skilled in the art that any particular code can be used, and this apparatus is not limited to the binary decimal code illustrated. Combinations of electrical and mechanical timing codes also can be used.

The number of recording tracks might vary, or they might be staggered lengthwise of the tape to utilize a large number of heads on a narrow tape.

This device, as has been shown previously, basically moves the tape forward coincidentally with the read-in data requirements. The motion, therefore, is intermittent by nature.

In some instances, it may be found desirable to make the digital recordings while the tape is stationary and to advance the tape a substantially predetermined step across the recording head after each recording through each digit switch. This type of operation can provide a recording using relatively smaller magnetic bits for each digit recorded so that the pack on the tape can be increased, if this is found desirable. FIGURES 9 through 14 illustrate a modification of the interrogating commutator or read-in switch and its associated tape and reel driving assembly for providing this type of recordation and operation.

As shown in FIGURES 9 and 10, the commutator comprises three wafers 36, 37, and 38, each in the form of a multi-step element comprising a plurality of stationary contacts 101 which are adapted to be connected to the various digit switches in the same manner as shown in FIGURE 8. The commutator is provided with a rotatable contactor 102 mounted on the shaft 69 and is adapted to be energized by the battery 39 through a stationary wiping contact 103. Details of this structure are shown in FIGURE 12. The arrangement of the contacts and contactor is the same for all three of the wafers 36, 37, and 38 of the commutator.

The operation of the commutator is similar to that which has been explained with reference to the construction shown in FIGURES 1 through 8, in which a knurled knob 78 is adapted to drive the shaft 69 through a one-way drive clutch, FIGURE 9 and FIGURE 14, when the detent 82 is depressed out of engagement with the bore 85 by pushing on the plunger 86. Any suitable one-way drive clutch can be used to provide the connection between the knob 78 and the shaft 69 and may comprise a simple ratchet wheel 104 arranged within the knob 78 and secured to the shaft 69 in any suitable manner, as by a set screw 104'. The ratchet wheel 104 may be advanced by turning the knob 78 so that one or more pawls 105, in the form of small leaf springs fastened to the knob 78, engage the driving faces 106 of the teeth of the pawl 104.

This commutator construction is provided with the same type of spring-biased latching ball 89 adapted to cooperate with a notched plate 87 mounted on the shaft 69 as in the commutator construction shown in FIGURES 1 through 8. This resiliently biased latch provides an initial slight forward biasing force to the shaft as soon as the plunger 86 has been depressed sufficiently to release the detent 82 from the bore 85 and assures that the commutator will be latched after each complete rotation thereof. The construction and operation of these features have already been explained and are illustrated in detail in FIGURES 9, 10, and 11 with reference to the present commutator structure.

With this type of arrangement, it is essential that the energizing circuit for each digit switch be closed prior to the operation of the capstan which advances the tape across the recording head, and also that each digit switch circuit be deenergized during each advance step of the tape. This, therefore, requires that the contactor 102 of each wafer of the commutator be stopped intermediate adjacent contacts 101 during the rotation of the capstan which advances the tape across the recording head. It also requires that the capstan remain stationary during the period when the contactor 102 is in engagement with a contact 101. This type of operation is accomplished by providing for an intermittent drive of the capstan and for also intermittently stopping the contactor 102 while the capstan is being driven. A resiliently biased cam and follower, together with a preloaded spring drive can provide this desired operation.

Such a construction is shown in FIGURES 9, 10, and 13, where a cam disc 107 is shown rigidly mounted on the shaft 69 in any suitable manner, as by having a central opening formed with flats 108 engaging corresponding flat surfaces 109 on the shaft 69 and being staked to the shaft, as shown at 110. The cam surface of the cam disc 107 is conveniently formed by a simple axially punched corrugated edge 111. The desired intermittent stopping of the contactor 102 intermediate adjacent contacts 101 is obtained by the provision of a spring-biased cam follower which is stationarily mounted on the commutator wafers and includes a ball 112 freely movable in a guide 113 mounted in a stationary plate 114 which is secured in position by the mounting bolts 115 and held in spaced relation thereby from the lowermost commutator wafer 38 by suitable spacers 116. A suitable biasing spring 117, preferably in the form of a spring plate similar to the spring 92, FIGURE 11, is secured to the plate 114 and engages the surface of the ball 112 away from the cam plate 107, so as to bias the ball 112 into engagement with the cam surface of the corrugated edge 111 of the cam plate. The ball 112 and the cam plate 107 are mounted in such relation to the commutator contactors 102 that the ball 112 is biased by the spring 117 into the valleys of the corrugated edge 111 so as to exert a force tending to hold the cam plate and therefore the shaft 69 and wafer contactor 102 intermittently stationary when the ball is in this position. It then requires a slight increase in the force exerted on the knob 78 to advance the shaft 69 as, in doing so, it is necessary to cause the ball 112 to rise to the crest of a corrugation in the corrugated edge 111 against the biasing force of the spring 117. This tends to provide the desired intermittent advance and stationary operation of the contactor 102.

In order to provide the intermittent drive of the capstan for advancing the magnetic tape the desired predetermined step over the recording head after each recording through each digit switch, a capstan 68' is provided which does not have a solid driving connection to the shaft 69. This capstan 68' is rotatably mounted on the base plate 55 in any suitable bearing 118 and is adapted to be driven intermittently by the shaft 69 during the period when the ball 112 is in engagement with a valley of the corrugated edge 111 of the cam plate, that is, during the period while the contactor 102 is substantially stationary and out of engagement with the commutator contacts 101. The desired intermittent delayed drive of the capstan 68' by the shaft 69 may be provided in any suitable manner, as by a loaded spring drive connection comprising a coil spring 119 secured to the shaft 69 and to the capstan 68'. During normal operation, the spring 119, in the illustrated embodiment, will be uncoiled as the shaft 69 is turned forwardly and the ball 112 is biased into a valley of the corrugated edge 111 of the cam plate. The constants of the spring 119 are chosen such that when the ball 112 reaches substantially each valley of the corrugated edge 111, the spring 119 is stressed so that it will exert sufficient force upon the capstan 68' to drive the capstan forwardly and advance the magnetic tape the desired step across the recording head. As the capstan 68' is driven and the shaft 69 is stationary, the stress in the spring 119 is relieved thus diminishing the driving force on the capstan 68' so that it will be advanced only substantially the predetermined step during the time that the commutator contactor 102 of each wafer is out of engagement with the wafer contacts 101. This provides for energizing the recording head through successive digit switches while the magnetic tape is stationary and for operating the reel assembly so as to advance the magnetic tape a substantially predetermined step across the recording head after each recording through each digit switch, thereby providing for an energization of the selected recording head channel or channels for a substantially uniform fraction of each step of the tape prior to each advance thereof for each digit to be recorded. The transport mechanism for the magnetic tape memory member may comprise the same type structure as that disclosed with reference to FIGURES 1–8 and be driven in any suitable manner as by a spring belt 65' through a pulley 120 drivingly mounted on the capstan 68', as has been described with reference to the embodiment shown in these figures.

The foregoing disclosure and description of the invention is illustrative and explanatory thereof and various changes in the size, shape and materials, as well as in the details of the illustrated constructions, may be made within the scope of the appended claims without departing from the spirit of the invention.

What is claimed is:

1. A magnetic digital recorder comprising, a multichannel recording head, a reel assembly for passing magnetic tape past said head, a plurality of digit switches, electrical conductors for selectively connecting each digit switch to selected channels of said recording head in accordance with selective switch positions, a capstan for operating said reel assembly to advance a magnetic tape across said recording head, a read-in interrogating switch having a plurality of selective switch positions, a source of power, means connecting said read-in interrogating switch to said source of power, electrical connecting means connected to said read-in interrogating switch and to said digit switches for energizing successive ones of said digit switches in accordance with successive read-in switch positions with rotation of said capstan, wherein a releasable latch means locks the capstan against rotation with each full revolution of the capstan, and means operable in response to release of the latch means for moving the capstan a sufficient distance to prevent re-engagement of the latch means until the capstan has been rotated a full turn.

2. A magnetic digital recorder comprising, a multichannel recording head, a reel assembly for passing magnetic tape past said head, a plurality of digit switches, electrical conductors for selectively connecting each digit switch to selected channels of said recording head in accordance with selective switch positions, a capstan for operating said reel assembly to advance a magnetic tape across said recording head, a read-in interrogating switch having a plurality of selective switch positions, a source of power, means connecting said read-in interrogating switch to said source of power, electrical connecting means connected to said read-in interrogating switch and to said digit switches for energizing successive ones of said digit switches in accordance with successive read-in switch positions with rotation of said capstan, wherein the reel assembly includes a pay-out reel, a friction drag brake with a friction drag plate connected to said pay-out reel, an anchored coil spring, another friction drag plate connected to said anchored coil spring, said coil spring arranged so as to be wound by rotation of said pay-out reel and tending to resist rotation of said pay-out reel to keep the magnetic tape under tension.

3. The recorder of claim 2 wherein the take-up reel assembly is equipped with a spring belt drive arranged in such a way that the spring in the drive belt is under tension to advance the take-up reel in the forward direction thus keeping the tape taut in that portion of the mechanism.

4. A magnetic digital recorder comprising, a multichannel recording head, a reel assembly for passing magnetic tape past said head, a plurality of digit switches each having a plurality of circuit connections to selected channels of said recording head and being constructed operable for selectively making and breaking circuits to one or more selected channels of said recording head in accordance with the digit to be recorded, means for energizing said recording head through said digit switches, and means for operating the reel assembly to advance a magnetic tape across said recording head during recording through each digit switch and for advancing the tape a substantially predetermined additional length without energization of said recording head for each digital recording.

5. A magnetic digital recorder comprising, a multichannel recording head, a reel assembly for passing magnetic tape past said head, a plurality of digit switches each having a plurality of circuit connections to selected channels of said recording head and being constructed operable for selectively making and breaking circuits to one or more selected channels of said recording head in accordance with the digit to be recorded, means for operating the reel assembly to advance a magnetic tape across said recording head during recording through each digit switch and for a substantially predetermined advance for each digital recording, and means for energizing said recording head through said digit switches for a substantially predetermined fraction of said tape advance during each recording, said reel assembly operating means including means for making an end-of-word record by predetermined selected channel energization of said recording head after completing the digit switch recordings.

6. A magnetic digital recorder comprising, a multichannel recording head, a reel assembly for passing magnetic tape past said head, a plurality of digit switches each having a plurality of circuit connections to selected channels of said recording head and being constructed operable for selectively making and breaking circuits to one or more selected channels of said recording head in accordance with the digit switch positions, and means for simultaneously operating the reel assembly to advance a magnetic tape across said recording head and sequentially energizing said recording head through successive ones of said digit switches, said operating means including means for making an end-of-word record by selected channel energization of said recording head after completing the recordings of said digit switches.

7. A magnetic digital recorder comprising, a multichannel recording head, a reel assembly for advancing magnetic tape past said head, a plurality of multiple position digit switches, electrical conductors for selectively connecting each digit switch to one or more selected channels of said recording head in accordance with selective switch positions corresponding to predetermined digits, and means including a read-in interrogating switch with a resiliently biased detent and multi-step element for energizing said recording head successively through said digit switches, said reel assembly including a capstan for driving magnetic tape across said recording head and a loaded spring driving connection of said capstan to said read-in switch for intermittently driving said capstan to advance the tape a substantially predetermined step after each digital recording.

8. A magnetic digital recorder comprising a multichannel magnetic recording head having a recording gap for each channel, means for advancing a magnetic recording tape as an inelastic member past said gaps in said recording head in a manner that permits recording to take place in any desired number of said head channels at any speed of advance of the tape variably settable means for manually preselecting the channels of said recording head to be energized according to the digits to be recorded, and means for manually operating said tape advancing means and for synchronously energizing the selected recording head channels for a substantially uniform fraction of the advance of the tape for each digit to be recorded.

9. A magnetic digital recorder comprising, a multichannel recording head, a reel assembly for passing magnetic tape past the head, a plurality of multi-wafer digit switches, electrical conduits for connecting selective contacts of one wafer of each digit switch to one channel of the recording head and for connecting selective contacts of another wafer of each digit switch to a second channel of the recording head and for connecting selective contacts of another wafer of each digit switch to a third and fourth channel of the recording head, means for energizing the recording head through successive ones of said digit switches, and means for operating the reel assembly to advance a magnetic tape across the recording head after recording through each digit switch.

10. A magnetic digital recorder comprising, a multichannel recording head, a reel assembly for passing magnetic tape past the head, a plurality of multi-wafer digit switches, electrical connectors for connecting selected contacts of one wafer of each digit switch to one channel of the recording head and for connecting selected contacts of another wafer of each digit switch to a second channel of the recording head and for connecting selected contacts of another wafer of each digit switch to a third and fourth channel of the recording head, a source of power, a multi-wafer read-in commutator for connecting the source of power to the digit switches, the wafers of the read-in commutator being connected respectively to separate wafers of the digit switches, and means for operating the reel assembly to advance a magnetic tape across the recording head and simultaneously operating the commutator to interrogate the digit switches.

11. A magnetic digital recorder having a frame and comprising a multi-channel magnetic recording head having a face with a recording gap for each channel, a magnetic tape transport assembly for advancing a magnetic recording tape as an inelastic member over said face past said gaps in a manner that permits recording at any speed of advance of the tape, said tape transport assembly comprising a pay-out reel resiliently biased to maintain a back tension on tape as it is paid out therefrom, a take-up reel, driving means including a capstan around which the magnetic tape is adapted to extend in driving engagement and for driving said take-up reel whereby the tape is reeled up from said capstan on said take-up reel and is maintained under tension therebetween, variably settable means for manually preselecting the channels of said recording head to be energized according to the digits to be recorded, and means for manually operating said tape transport assembly and for synchronously energizing the selected recording head channels for a substantially uniform fraction of the advance of the tape for each digit to be recorded.

12. In a magnetic digital recorder having a frame and comprising a multi-channel magnetic recording head having a face with a recording gap therein for each channel, a magnetic tape transport assembly for advancing a magnetic recording tape as an inelastic member over said face past said gaps therein in a manner that permits recording at any speed of advance of the tape, said tape transport assembly comprising a pay-out reel, means for continuously resisting rotation of said pay-out reel comprising a friction plate secured to said pay-out reel, a second friction plate, a compression coil spring anchored at one end to said frame and secured at the other end to said second friction plate and held in compression between said frame and said second friction plate thereby resiliently biasing said friction plates into frictional engagement, said coil spring being constructed and said spring end securing arrangement being such that rotation of said pay-out reel in a tape pay-out direction tends to unwind the convolutions of said spring whereby a substantially constant resisting torque is exerted by said spring on said reel through said friction plates so as to maintain a back tension on tape as it is paid out from said pay-out reel, said tape transport assembly also including a take-up reel, driving means including a capstan around which the magnetic tape is adapted to extend in driving engagement, a roller rockably mounted and arranged to engage the tape as it extends around said capstan, means resiliently loading said roller for biasing said roller into engagement with tape on said capstan under a substantially predetermined pressure whereby the tape is held firmly against relative slippage with said capstan and in frictional driving engagement therewith, and means including a coil spring driving belt for driving said take-up reel from said capstan whereby the tape is reeled up from said capstan on said take-up reel and is maintained under tension therebetween by the tension of said spring belt.

13. In a magnetic digital recorder having a frame and and comprising a multi-channel magnetic recording head having a face with a recording gap therein for each channel, a magnetic tape transport assembly for advancing a magnetic recording tape as an inelastic member over said face past said gaps therein in a manner that permits recording at any speed of advance of the tape, said tape transport assembly comprising a pay-out reel, means for continuously resisting rotation of said pay-out reel comprising a friction plate secured to said pay-out reel, a second friction plate, a compression coil spring anchored at one end to said frame and secured at the other end to said second friction plate and held in compression between said frame and said second friction plate thereby resiliently biasing said friction plates into frictional engagement, said coil spring being constructed and said spring end securing arrangement being such that rotation of said pay-out reel in a tape pay-out direction tends to unwind the convolutions of said spring whereby a substantially constant resisting torque is exerted by said spring on said reel through said friction plates so as to maintain a back tension on tape as it is paid out from said pay-out reel, said tape transport assembly also including a take-up reel, driving means including a drive shaft and a capstan around which the magnetic tape is adapted to extend in driving engagement and including a multi-step element and a loaded spring intermittent drive for said capstan by said drive shaft, a roller rockably mounted and arranged to engage the tape as it extends around said capstan, means resiliently biasing said roller into engagement with tape on said capstan under a substantially predetermined pressure whereby the tape is held firmly against relative slippage with said capstan and in frictional driving engagement therewith, and means for driving said take-up reel by said intermittent drive whereby tape is reeled up from said capstan on said take-up reel and is maintained under tension therebetween.

14. In a magnetic digital recorder having a frame and comprising a multi-channel magnetic recording head having a face with a recording gap therein for each channel, a magnetic tape transport assembly for advancing a magnetic recording tape as an inelastic member over said face past said gaps in a manner that permits recording at any speed of advance of the tape, said tape transport assembly comprising a payout reel, means comprising a drag brake for providing a substantially constant torque resisting rotation of said pay-out reel so as to maintain a back tension on tape as it is paid out from said payout reel, a take-up reel, driving means including a capstan around which the magnetic tape is adapted to extend in driving engagement, means including a coil spring belt for driving said take-up reel by said driving means and for maintaining tension on tape between said capstan and said take-up reel whereby the tape is reeled up from said capstan on said take-up reel, and a pressure pad including means for resiliently biasing said pad into engagement with the tape where it extends over said recording head face whereby the tape is resiliently held in engagement with said face and over the channel gaps therein.

15. A magnetic digital recorder having a frame and comprising a multi-channel magnetic recording head having a face with a recording gap therein for each channel, a magnetic tape transport assembly for advancing a magnetic recording tape as an inelastic member over said face past said gaps in a manner that permits recording at any speed of advance of the tape, said tape transport assembly comprising a pay-out reel, means comprising a drag brake for providing a substantially constant torque resisting rotation of said pay-out reel so as to maintain a back tension on tape as it is paid out from said pay-out reel, a take-up reel, driving means including a capstan around which the magnetic tape is adapted to extend in driving engagement, means resiliently biasing the tape into engagement with said capstan for holding the tape firmly against relative slippage on said capstan and in frictional driving engagement therewith, means for driving said take-up reel by said driving means whereby the tape is reeled up from said capstan on said take-up reel and is maintained under tension therebetween, means for manually preselecting the channels of said recording head to be energized according to the digits to be recorded, and means for manually operating said tape transport assembly and for synchronously energizing the selected recording head channels for a substantially uniform fraction of the advance of the tape for each digit to be recorded.

16. A magnetic digital recorder having a frame and comprising a multi-channel magnetic recording head having a face with a recording gap for each channel, means for manually preselecting the channels of said recording head to be energized according to the digits to be recorded, a magnetic tape transport assembly for advancing a magnetic recording tape as an inelastic member over said face past said gaps in a manner that permits operation at any speed of advance of the tape, said tape transport assembly comprising a pay-out reel resiliently biased to maintain a back tension on tape as it is paid out therefrom, a take-up reel, driving means including a capstan around which the magnetic tape is adapted to extend in driving engagment and including means for driving said take-up reel whereby the tape is reeled up from said capstan on said take-up reel and is maintained under tension therebetween, and means for manually operating said tape transport assembly by an intermittent spring drive and detent for a substantially predetermined step after each digital recording and for energizing the selected recording head channels for a substantially uniform fraction of each step of the tape prior to each intermittent advance drive thereof for each digit recorded.

17. A magnetic digital recorder comprising, a multichannel recording head, a reel assembly for passing magnetic tape past said head, a plurality of digit switches each having a plurality of circuit connections to selected channels of said recording head and being constructed operable for selectively making and breaking circuits to one or more selected channels of said recording head in accordance with the digit to be recorded, means for operating the reel assembly to advance a magnetic tape across said recording head during recording through each digit switch and for a substantially predetermined advance after each digital recording, and means for energizing said recording head through said digit switches for a substantially predetermined fraction of said tape advance during each recording, said reel assembly operating means including means for making an end-of-word record by predetermined selected channel energization of said recording head after completing the digit switch recordings.

18. A magnetic digital recorder comprising, a multichannel recording head, a reel assembly for passing magnetic tape past said head, a plurality of digit switches, electrical conductors for selectively connecting each digit switch to selected channels of said recording head in accordance with selective switch positions, a capstan for operating said reel assembly to advance a magnetic tape across said recording head, a read-in interrogating switch having a plurality of selective switch positions, a source of power, means connecting said read-in switch to said source of power, electrical connection means connected to said read-in interrogating switch and to said digit switches for successively energizing said digit switches, and a delayed-drive connection of said read-in switch to said capstan for advanceing said capstan after each read-in energization of a digit switch.

19. A magnetic recorder comprising a multi-channel magnetic recording head, transport means for supporting and advancing a magnetic recording tape a substantially predetermined step for each recording as an inelastic member over said recording head in a manner that permits recording to take place in any desired number of said head channels at any speed of advance of the tape, dial input switch means for manually preselecting the channels of said recording head to be energized according to the symbol to be recorded as represented by the position of said dial input switch means for energizing the selected recording head channels for a substantially uniform fraction of each step of the tape for each symbol to be recorded, and visual indicating means operatively associated with said dial input switch means having indicia corresponding to positions of said dial switch means for indicating the symbols represented by such switch positions.

20. A magnetic recorder comprising a multi-channel magnetic recording head, transport means for supporting and advancing a magnetic recording tape a substantially predetermined step for each recording, dial input digit switches for manually preselecting the channels of said recording head to be energized according to the digit to be recorded as represented by the position of the dial input digit switches for energizing the selected recording head chanels for a substantially uniform fraction of each step of the tape for each digit to be recorded, and visual indicating means having indicia corresponding to positions of said dial digit switches for indicating the digits represented by such switch positions.

21. A magnetic digital recorder comprising a multichannel recording head, dial input switch means having multiple contact positions, visual indicating means operatively associated with said dial input switch means having indicia corresponding to said switch contact positions for indicating the digit represented by the amount of dial switch means rotation, intermittent transport and friction drive means providing a support for a recording tape media such that the media is transported a substantially uniform distance for the recordation by said head of each dial input, and manually operable means for electrically connecting said dial input switch means to said multichannel recording head for recording indicia on the media indicative of the digit represented by the rotation of said dial input switch means.

22. A magnetic digital recorder comprising a multichannel recording head, manually operable dial input switch means, visual indicaing means operatively associated with said dial input switch means for indicating the amount of dial switch means rotation, recording media transport and friction drive means providing a support for a recording media such that the media is transported a substantially uniform distance for the recordation of each dial input, and means connecting said dial input switch means to said multi-channel recording head for recording indicia on the media indicative of the rotation of said dial input switch means.

23. A magnetic tape recorder comprising a multi-channel recording head, manually rotatable dial input means having indicating means operatively associated with said dial input means for indicating a symbol corresponding to the rotation of said dial input means, tape transport and drive means providing a support for a recording tape such that the tape is transported a substantially uniform distance for the recordation of each dial input, and means connecting said dial input means to said multi-channel recording head for recording indicia on the tape indicative of the symbol represented by the rotation of said dial input means.

References Cited by the Examiner

UNITED STATES PATENTS

| | | | |
|---|---|---|---|
| 1,340,710 | 5/1920 | Graham | 242—75.4 |
| 2,704,466 | 3/1955 | Way | 74—528 |
| 2,784,049 | 3/1957 | Mitchell | 340—174.1 |
| 2,864,557 | 12/1958 | Hobbs | 340—347 |
| 2,916,728 | 12/1959 | Gilson | 179—100.2 |
| 2,924,669 | 2/1960 | Schmidt et al. | 179—100.2 |
| 2,924,989 | 2/1960 | Leonard | 74—528 |
| 2,964,374 | 12/1960 | Miller | 346—17 |
| 2,988,177 | 6/1961 | Conrad | 188—83 |
| 3,006,712 | 10/1961 | Eichacker | 346—50 |
| 3,025,931 | 3/1962 | Jones | 188—83 |
| 3,059,239 | 10/1962 | Snyder | 346—74 |
| 3,070,800 | 12/1962 | Brown | 346—74 |
| 3,090,536 | 5/1963 | Kleinerman | 179—100.2 |
| 3,103,401 | 9/1963 | Daniels et al. | 346—74 |

BERNARD KONICK, *Primary Examiner.*

IRVING SRAGOW, *Examiner.*

A. F. BERNARD, R. J. McCLOSKEY, *Assistant Examiners.*